United States Patent

[11] 3,540,555

[72] Inventor Daniel L. Bolenbaugh
South Bend, Indiana
[21] Appl. No. 793,385
[22] Filed Jan. 23, 1969
[45] Patented Nov. 17, 1970
[73] Assignee The Bendix Corporation
a corporation of Delaware

[54] AUTOMATIC BRAKE ADJUSTER MECHANISM
14 Claims, 6 Drawing Figs.
[52] U.S. Cl........................................ 188/79.5,
188/196
[51] Int. Cl.................................... F16d 51/70,
F16d 65/56
[50] Field of Search........................ 188/79.5GC,
GT, 196RR

[56] References Cited
UNITED STATES PATENTS
| | | | |
|---|---|---|---|
| 3,010,544 | 11/1961 | Dahle et al................... | 188/79.5 |
| 3,114,438 | 12/1963 | Helvern...................... | 188/79.5 |
| 3,126,074 | 3/1964 | Swift.......................... | 188/79.5 |

Primary Examiner—Duane A. Reger
Attorneys—C. F. Arens and Plante, Arens, Hartz and O'Brien ABSTRACT: This invention relates to an automatic adjuster mechanism for a drum brake and is comprised of a force transmitting member which is pivotally attached to the brake backing plate and responsive to brake shoe lining wear to actuate a pawl member through an overtravel means which adjusts an automatic adjuster to compensate for lining wear.

Patented Nov. 17, 1970

INVENTOR.
DANIEL L. BOLENBAUGH
BY
Plante, Arens, Hartz, Hix and Smith
ATTORNEYS

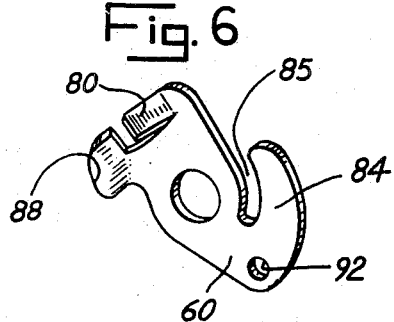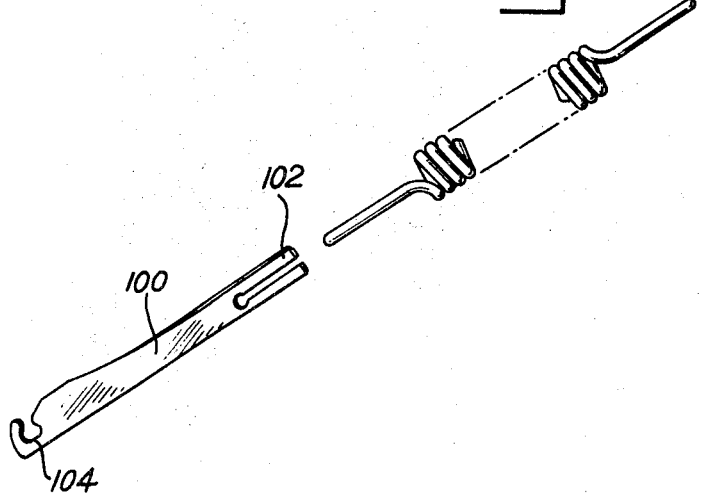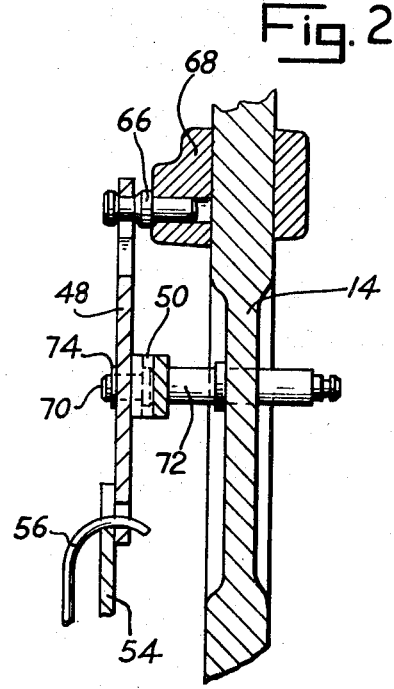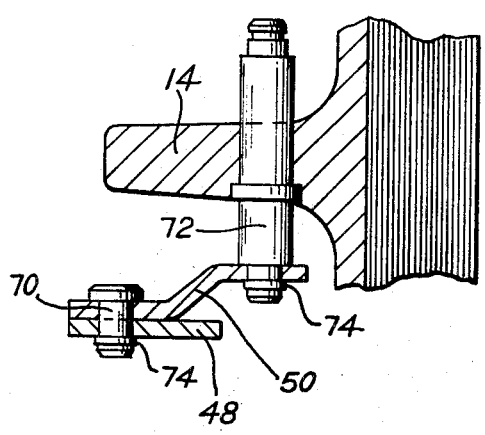

AUTOMATIC BRAKE ADJUSTER MECHANISM

BACKGROUND OF THE INVENTION

The invention concerns an automatic brake adjuster mechanism of the variety generally used in association with a drum type brake. However, it is felt that the invention is sufficiently broad enough in concept to facilitate its use for any application where automatic adjustment is required.

The conventional brake adjuster devices with which I am familiar are comprised of rather sophisticated structure which are bulky by nature. Thus, installation in the confined area of the typical drum brake has been difficult and in some instances impossible. Moreover, where installations have been made using the conventional hardware, costs have been high and the systems have proven themselves to be unreliable.

SUMMARY OF THE INVENTION

It is an object of this invention to provide a drum brake with an automatic adjusting mechanism to compensate for lining wear during brake actuation.

It is an object of this invention to provide a drum brake with an automatic adjuster which adjusts the brake during brake actuation.

It is an object of this invention to provide a smaller, more compact, structural concept for accomplishing automatic adjustment.

It is an object of this invention to provide a force transmitting member that is pivotally mounted to the brake backing plate at a point other than the conventional anchor point used as a reference for the brake shoes.

It is an object of this invention to provide an automatic adjusting mechanism for a drum brake employing a new and unique overtravel means.

It is an object of this invention to provide a pawl member for actuating the adjuster that is uniquely resiliently preloaded to improve the accuracy of adjustment in response to lining wear.

The above-mentioned and other features and objects of this invention and the manner of attaining them will become more apparent and the invention itself will be best understood by reference to the following description of embodiments of the invention taken in conjunction with the accompanying drawings.

BRIEF DESCRIPTION OF THE DRAWINGS

FIG. 2 is a view taken along section line 2-2 of FIG. 1;
FIG. 3 is a view taken along section line 3-3 of FIG. 1;
FIG. 5 is a modified form of the overtravel means shown in FIG. 1;
and
FIG. 6 is an enlarged view of the ratchet member shown in FIG. 1.

DESCRIPTION OF THE PREFERRED EMBODIMENT

Figure 1:
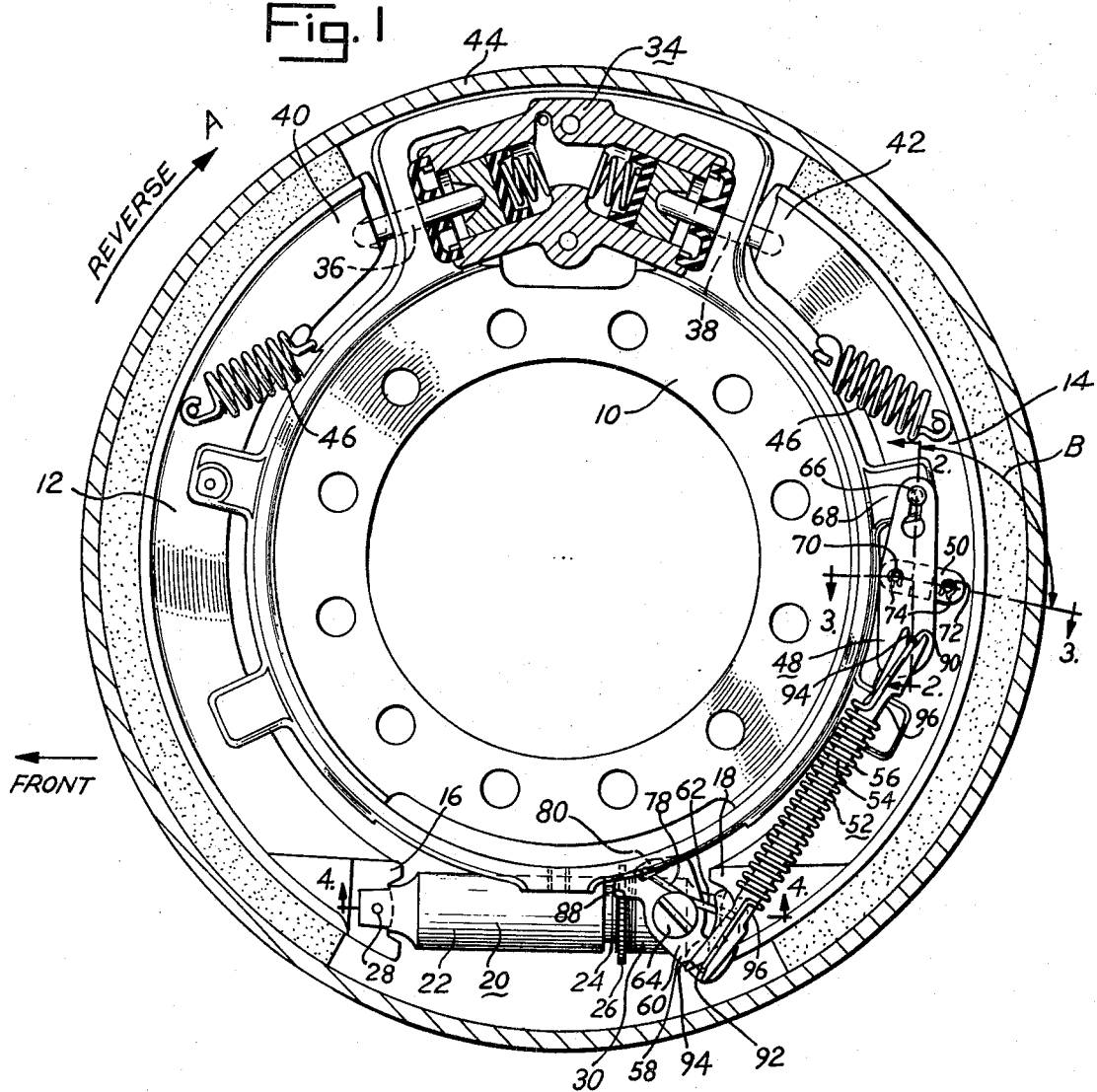
FIG. 1 is an elevation view of a brake illustrating one embodiment of the invention.
Figure 4:
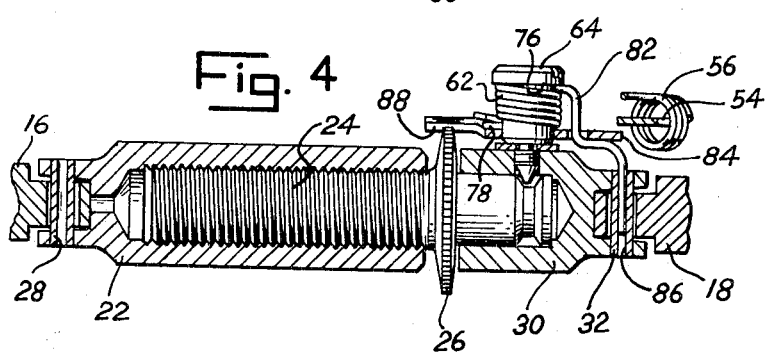
FIG. 4 is a view taken along section line 4-4 of FIG. 1.

Referring now to the drawings, and specifically FIG. 1, a backing plate or support 10 is adapted to be mounted to a fixed part of a vehicle such as an axle flange (not shown). A pair of brake shoes 12 and 14 is slidably mounted on the backing plate and is interconnected at one pair of adjacent ends 16 and 18 by an adjuster mechanism 20 which comprises an adjusting screw nut 22 and a rotatable adjusting screw 24 having a rotatable serrated wheel 26 integral therewith. The adjusting screw nut 22 is pivotally fixed to the end 16 of the brake shoe 12 by means of pin 28 and the adjusting screw 24 is rotatably mounted in a cap member 30 which is pivotally fixed to the end 18 of the brake shoe 14 by a pin 32. An actuator means 34 is rigidly fixed to the backing plate 10 and has connecting links 36 and 38 which are connected to the other ends 40 and 42 of the brake shoes 12 and 14, respectively. The links are, of course, connected to the webs of each shoe for spreading the shoes into engagement with a brake drum 44 in response to fluid actuation of the actuator means 34. Backing plate to shoe return springs 46, which may be suitably located on both sides of each shoe, serve to retract the brake shoes against the actuator means 34 to their brake release position.

Referring now to FIGS. 1, 2, 3, and 4, an automatic adjusting mechanism is provided to work in cooperation with the rotatable serrated wheel 26 and comprises a force transmitting member 48 including a linkage means 50, an overtravel or connecting means 52 including a rigid portion 54 and a resilient element 56 and, a pawl member 58 including a ratchet member 60, a coil spring 62 and a retainer means 64. The force transmitting member 48 is pivotally attached by a pin 66 to web 68 of the backing plate 10. The linkage means 50 is pivotally attached to the force transmitting member 48 by pin 70 and pivotally attached to shoe 14 by means of pin 72. As may be seen best in FIG. 1, C-rings 74 are used in cooperation with the pins 70 and 72 to retain the force transmitting member and linkage means in place. The ratchet member 60 is mounted in place with respect to the rotatable serrated wheel 26 by retainer means 64 which is threadably secured to the cap member 30. Coil spring 62 is suitably installed around the retainer means 64 and compressed axially against the ratchet member 60 by flanged end 76 of the retainer means 64. The end 78 of coil spring 62 which abuts the ratchet member 60 extends radially and is wedged between a tang 80 and the ratchet member 60. The other end 82 of the coil spring 62 extends first radially and then projects downward near the ratchet member 60 to touch and exert a force against extended portion 84 of said ratchet member 60 after which said end 82 curves and projects into bore 86 of the pin 32. As may be seen best in FIG. 6, the space 85 intermediate the extended portion 84 and the ratchet member 60 is provided to allow the ratchet member 60 to rotate counterclockwise upon actuation of the adjuster without abutting said end 82 of the coil spring 62. Although the extended portion 84 of the ratchet member 60 may be frictionally engaged by said end 82, sliding action will occur as force is applied to said ratchet member to rotate the serrated wheel 26. It is further noted that face 88 of the ratchet member 60 is positioned substantially parallel with the tooth face of the serrated wheel 26 in the brake released position. The overtravel or connecting means 52 is pivotally connected to the force transmitting member 48 and the pawl member 58 by means of the holes or pivot points 90 and 92, respectively. The resilient element or coil spring 56 is stretched or preloaded on the rigid portion 54 between notches 94 prior to installation in said pivot points. The axial preload of the coil spring 56 is predetermined to allow sufficient force to be exerted on the pawl member 58 by the force transmitting member 48 through the connecting means 52 to advance the serrated wheel 26 and thus provide adjustment for the brake as lining wear is experienced. However, if too much force is applied to the force transmitting member 48 during a braking application, this force if transmitted ultimately to the serrated wheel 26 could damage either the wheel or the pawl member 58 and thus, the resilient element or coil spring 56 will stretch thereby limiting the force applied to the pawl member and serrated wheel to preclude damage thereto. During this stretching of the coil spring 56 an elongated slot 96 is provided on the side of the rigid portion 54 to preclude said rigid portion 56 from sliding axially too far in either direction and thus sliding off the end of either the force transmitting member 48 or the pawl member 58.

Referring now briefly to FIG. 5, therein is shown a modified form of the rigid portion 54 of the connecting means 52. The rigid portion here is comprised of two substantially identical segments 100 having bifurcated ends 102 which mate and fully engage as a resilient element or coil spring is preloaded against notches 104 available on the other ends of each segment. Each of the segments 100 would have approximately 45° of twist between its bifurcated end 102 and the notch 104, such that when the two segments are mated, the opposite ends are in substantially the same plane. Of course, the coil spring would be installed as aforementioned with respect to the force transmitting member 48 and the pawl member 58. Upon a braking application where the force levels were such that the overtravel spring would begin to stretch, the mating bifurcated ends would separate to the axial extent necessary and upon brake release would return to their normal engaging position.

Although the automatic brake adjusting mechanism has been shown in association with brake shoe 14 which only operates to adjust the adjuster mechanism 20 as the brakes are applied travelling in a reverse direction, the automatic adjuster mechanism could equally be installed to operate with brake shoe 12 and thus adjust for lining wear as the vehicle is braked going in a forward direction.

MODE OF OPERATION OF THE PREFERRED EMBODIMENT

Upon brake application by actuation of the actuator means 34, and assuming rotation of the brake drum 44 in the direction of Arrow A, the shoes 12 and 14 will be spread until they engage the brake drum 44 at which time the brake drum will tend to carry the shoe 12 so as to cause its end 40 to anchor against the actuator means 34 through linkage 36. The actuator means 34 will further exert a force through linkage 38 on end 42 of the brake shoe 14 causing it to frictionally engage the drum 44 and exert a force through the adjuster mechanism 20 to the brake shoe 12 to assist it in frictionally engaging the drum 44. As the brakes are applied and the brake shoes move toward the brake drum 44, pin 72 and linkage means 50 will move radially outward causing the force transmitting means 48 through the connecting means 52 to exert a force on the pawl member 58 to rotate same counterclockwise about the retainer means 64 as best shown in FIG. 1. Since upon a braking application pivot points 90 and 92 move the same distance, the rotation of the pawl member is a direct function of the amount of brake lining wear experienced. Further, it is noted that the adjuster structure is of a predetermined design such that points 90 and 92 also move the same distance during forward braking to continuously maintain pawl face 88 substantially parallel to the centerline of the adjuster mechanism 20 throughout the life of the lining of the brake shoes 12 and 14. Thus, the rotatable serrated wheel 26 is rotated by the pawl member 58 to compensate only for the amount of brake lining loss due to braking applications. If during a braking application the force being transmitted by member 48 at pivot point 90 exceeds a predetermined value the coil spring 56 will stretch to preclude additional force from being exerted on the pawl member 58 and serrated wheel 26. It is important to note that the axial compression of the coil spring 62 against the ratchet member 60 in cooperation with the upward force of end 82 against the extended portion 84 and the downward force of end 78 wedged in the tang 80, tend to keep the face 88 of the ratchet member 60 from riding up and over the teeth of the serrated wheel 26 as force is applied to the pawl member 58 by the force transmitting means 48. Should the force transmitted to the pawl member 58 become very high, the design of the face 88 of the ratchet member 60 is sloped upward to minimize damage to the ratchet member 60 as well as the serrated wheel 26. Upon release of the brakes the return springs 46 will pull the brake shoes 12 and 14 away from the brake drum 44. The force transmitting member 48 and the linkage means 50 will return automatically to the brake release position as shown in FIG. 1. End 78 of the coil spring 62 in cooperation with tang 80 of the ratchet member 60 will exert a clockwise rotational force, as viewed in FIG. 1, which will return the pawl member 58 to the brake released position. It is further important to note that the angle B between a center line taken through the two pivot points of the linkage means 50 and a center line taken through the two end pivot points of the force transmitting member 48 must remain larger that 90° to ensure that said force transmitting member 48 will return to its brake released position after any brake application. As will be understood by those skilled in the art, when the pawl member 58 returns to its brake released position after a brake application, the face 88 of the ratchet member 60 will either remain on the same tooth of the serrated wheel 26 or pick up a new tooth, depending upon the increment of wear of the lining on the brake shoes.

It should be understood that the particular automatic adjusting mechanism is not limited in its use to the type brake shown in FIG. 1, but may be utilized on numerous other types of brakes.

While the specific details have been herein shown and described, the invention is not confined thereto, as other substitutions can be made within the spirit and scope of the invention.

I claim:
1. A brake assembly comprising:
   a support;
   a pair of brake shoes slidably mounted on said support;
   an actuator means operatively engaging each of said shoes;
   an adjuster mechanism operatively engaging each of said shoes;
   said adjuster mechanism including a rotatable serrated wheel;
   a pivotable pawl member having a portion operatively connected to said rotatable serrated wheel for rotating same;
   a force transmitting member pivotally connected to said support, including a linkage means pivotally connected to said force transmitting member and one of said brake shoes for imparting a force on said pawl member for pivoting same;
   means pivotally connecting said members; and
   said connecting means comprising a rigid portion and a resilient element stretched between the ends of said rigid portion and connected to said members to provide for relative movement therebetween when the force transmitted by said force transmitting member exceeds a predetermined amount fixed by said resilient element.

2. A brake assembly as recited in claim 1, wherein said force transmitting member is pivotally connected to said support at a point intermediate said actuator means and said adjuster mechanism.

3. A brake assembly as recited in claim 1, wherein said force transmitting member is pivotally connected to said support at a point adjacent a point intermediate the ends of said one brake shoe.

4. A brake assembly as recited in claim 1, wherein said pawl member comprises:
   a ratchet member having a face operatively engaging said rotatable serrated wheel and a bore therein for cooperation with a retainer means, thereby providing for pivotal responsiveness to said connecting means to rotatably advance said wheel during a braking application;
   a coil spring having one end retained by said adjuster mechanism and its or other end operatively secured to said ratchet member; and
   said retainer means having a flanged end for engagement with said spring and being operatively secured to said adjuster mechanism to compress said spring against said ratchet member a predetermined amount.

5. A brake assembly as recited in claim 1, wherein said rigid portion is comprised of at least two mating segments, axially extendable with respect to each other and having notches on their other ends for receipt of said resilient element.

6. A rigid portion as recited in claim 5, wherein said mating segments have engaging bifurcated portions with each of said segments being formed such that said other ends are in substantially the same plane.

7. A brake assembly as recited in claim 1, wherein said rigid portion includes a notch at each end for cooperation with said resilient element in establishing predetermined axial preload, and an elongated slot on one side against which said resilient element may abut during relative movement therebetween to maintain axial alinement of said connecting means with respect to said force transmitting member and said pawl member.

8. A brake assembly as recited in claim 1, wherein said force transmitting member is pivotally connected on one end to said support and on its other end to said connecting means with said linkage means being connected intermediate said ends.

9. A brake assembly as recited in claim 1, wherein said force transmitting member and said linkage means have therebetween an angle that must be greater than 90° to allow the force transmitting member to return to its normal released position after a braking application.

10. A brake assembly as recited in claim 1, wherein said means pivotally connecting said members has a pivot point with respect to said force transmitting member and a pivot point with respect to said pawl member, said pivot points being of predetermined design so as to move the same distance during adjustment of said adjuster mechanism.

11. A pawl member as recited in claim 4, wherein said coil spring is compressed axially against said ratchet member and in conjunction with said other end, operatively secured to said ratchet member, predetermines the radial preload of said ratchet member with respect to said rotatable serrated wheel.

12. A pawl member as recited in claim 4, wherein said other end in response to said coil spring exerts a predetermined rotational preload acting to return said ratchet member to its normal released position after a braking application.

13. A brake assembly as recited in claim 1, further including spring means interposed between said shoes and said support.

14. A brake assembly as recited in claim 1, wherein said means pivotally connecting said members has a pivot point with respect to said force transmitting member and a pivot point with respect to said pawl member, said pivot points being of predetermined design so as to move the same distance during braking applications when said adjuster mechanism is inoperative, to maintain said portion operatively connected to said rotatable serrated wheel in substantially parallel alinement with an imaginary centerline taken through said adjuster mechanism throughout the operable life of said brake shoes.